UNITED STATES PATENT OFFICE.

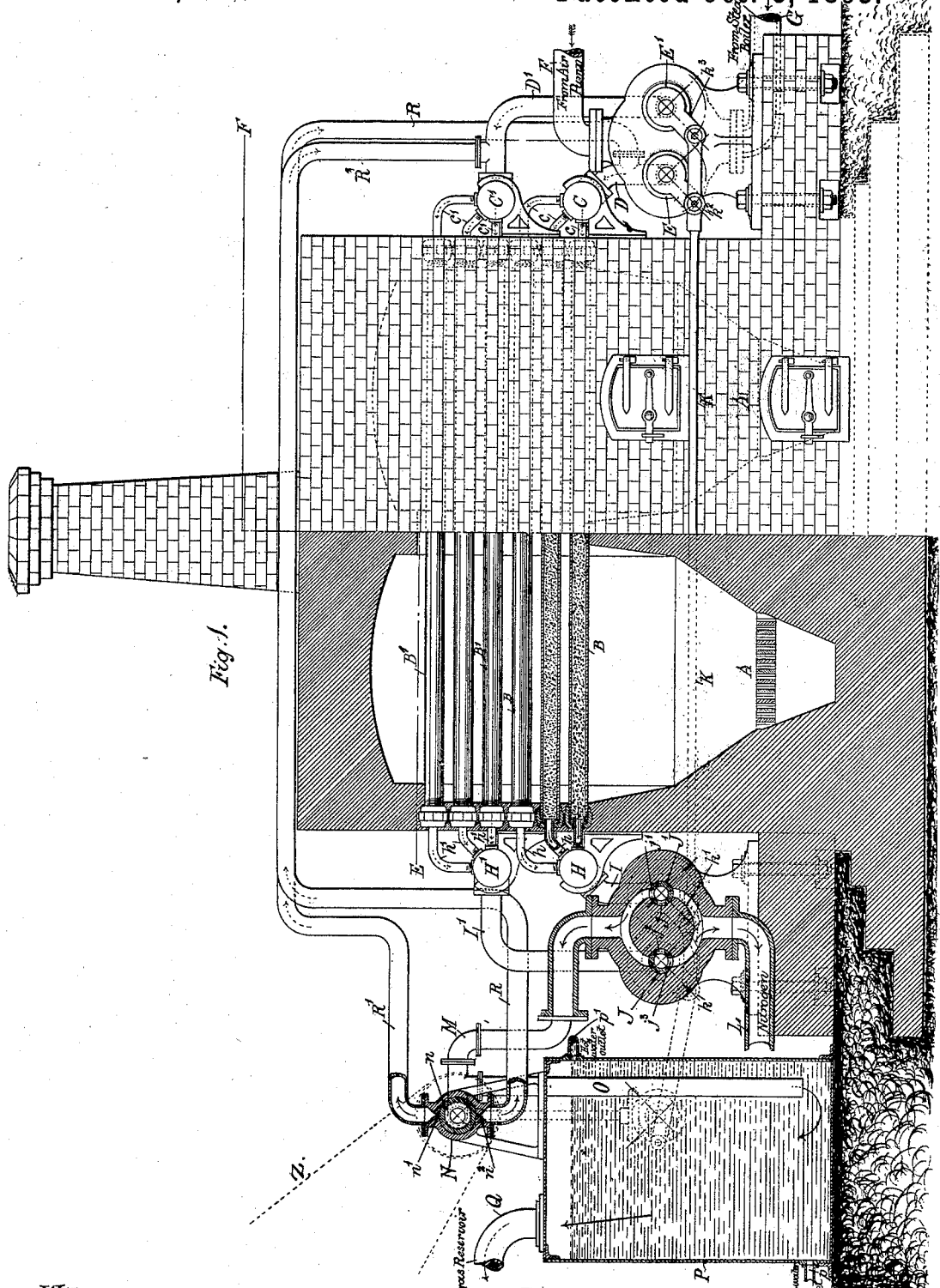

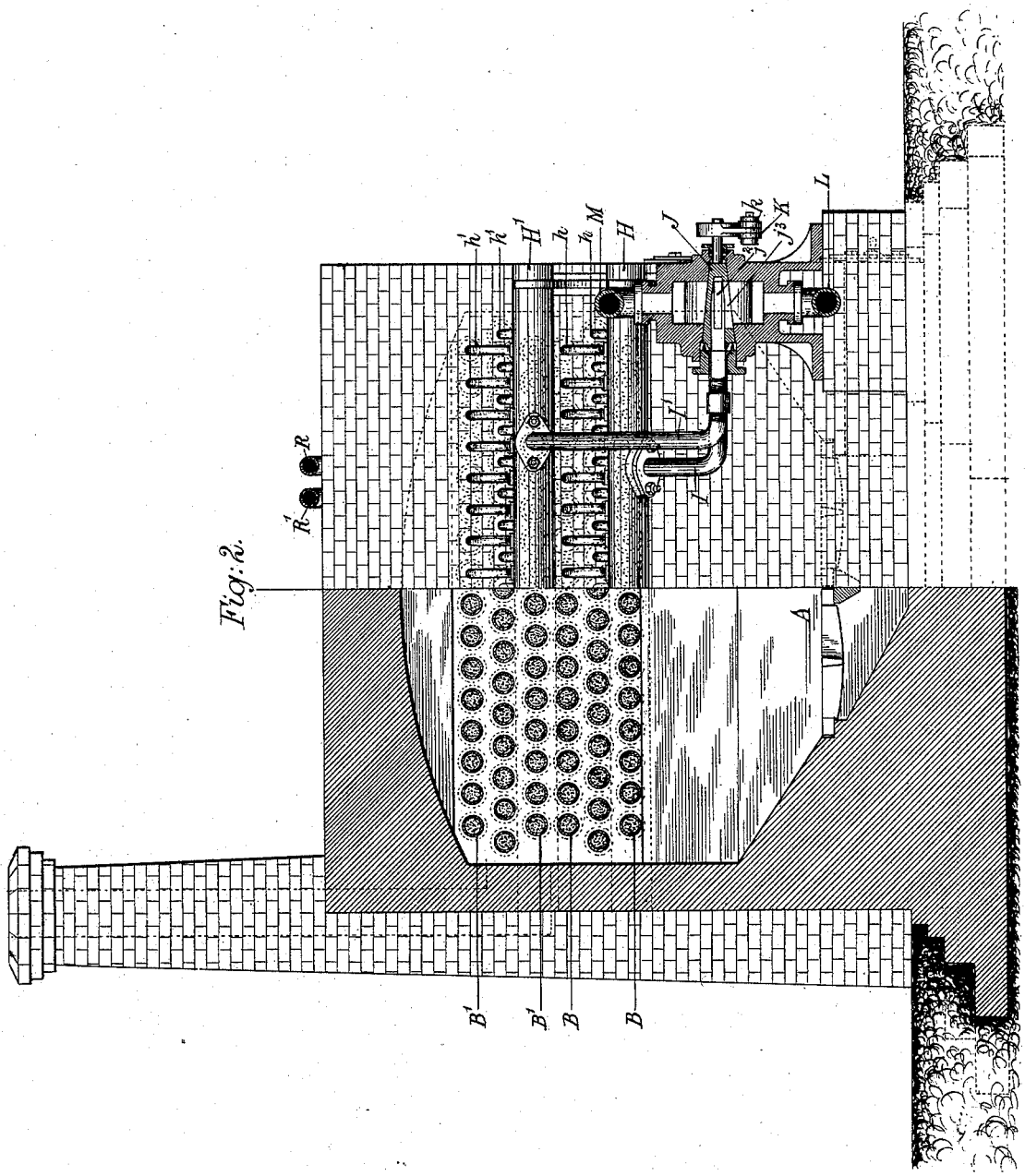

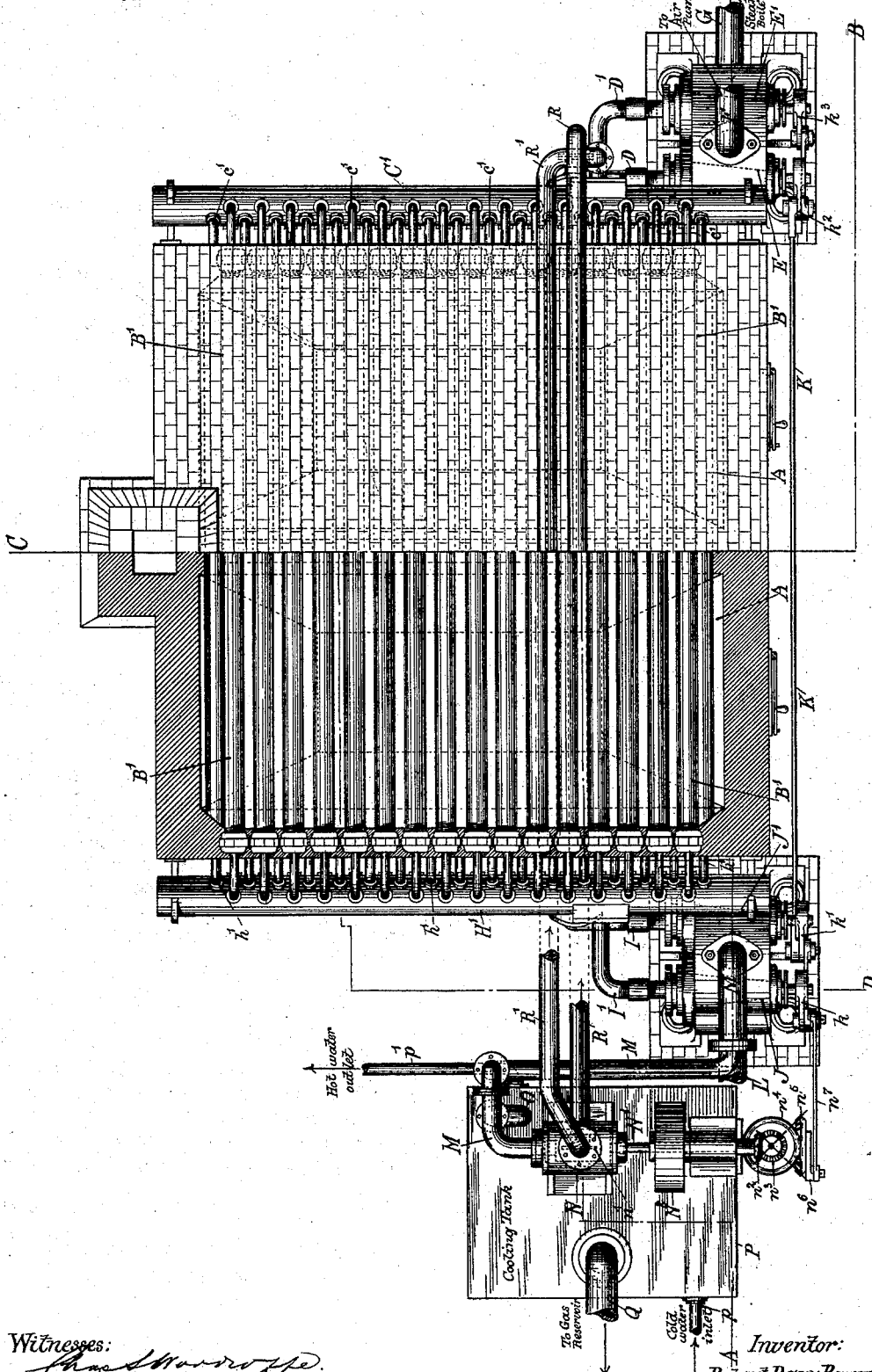

ROBERT D. BOWMAN, OF LONDON, ENGLAND.

APPARATUS FOR MAKING OXYGEN.

SPECIFICATION forming part of Letters Patent No. 505,809, dated October 3, 1893.

Application filed December 10, 1890. Serial No. 374,242. (No model.) Patented in England May 20, 1890, No. 7,851.

*To all whom it may concern:*

Be it known that I, ROBERT DAVY BOWMAN, lighting engineer, a subject of the Queen of Great Britain, residing at No. 80 Lordship Lane, East Dulwich, in the county of Surrey, England, have invented an Improved Process and Apparatus for the Production of Oxygen Gas, (for which I have received Letters Patent in Great Britain No. 7,851, dated May 20, 1890,) of which the following is a specification.

This invention relates to improvements upon the well known manganate of soda method for the production of free oxygen, and consists of two parts, first, it relates to the process, and especially to the preparation in a suitable manner of the manganate material, and to the management of the gaseous flow so as to prevent the initial effluxes of oxygen, which are diluted with an excess of atmospheric air, from being lost; and secondly, it relates to the apparatus by means of which the oxygen is produced.

In carrying my invention into effect, a closed vessel of iron, or other material suitable for the purpose, and of a proper shape, is half filled with sodium hydrate, and the whole is raised to a red heat, and kept at that temperature until ebullition has ceased. The object of this is to expel all the water and leave the soda as pure as the present invention requires. Small quantities of dried sesquioxide or peroxide of manganese, preferably the former, are next added to the dried soda until the whole mass attains, after continued stirring, a plastic granular condition. This stirring is effected by means of a plain stirring rod, or by any suitable device. Little or no air is allowed to come into contact with the granules up to this stage. No chemical action takes place, and the mixture of the soda and manganese is only a mechanical one. I cannot give the exact proportions of sodium hydrate and manganese salt because they both vary, as ordinarily met with, in point of purity, but the average proportions are two thirds of manganese to one of the hydrate. As soon as the granules refuse to stick together they are dusted over with black oxide of copper. This dusting has the effect of preventing them sticking together. They are then exposed to a red heat in a full current of air until they assume a dark green or black color as a consequence of their absorption of oxygen from the said current. The granules prepared in this way will withstand a very high temperature without fusing, and, as a consequence, a large surface will be exposed to the action of the alternate currents of air and steam hereinafter described. The above described process of preparing the granules occupies about half an hour. The granules thus prepared are ready to be introduced into the tubes or tubular retorts of the oxygen producing apparatus.

The well known process for the preparation of oxygen gas by means of manganate of soda consists in heating the soda compound in retorts made of iron, or other suitable material, and keeping it at a dull red heat. Steam is then passed through the retorts with the result that the material is decomposed into sodium hydrate, manganese, and free oxygen. The oxygen is then conveyed to any convenient gas holder. As soon as all the free oxygen has been given off, the current of steam is replaced by one of asmospheric air. The oxygen of the latter is absorbed by the material, and its nitrogen isolated. When the absorption of oxygen has ceased, the air-current is cut off, and that of steam again turned into the retorts to liberate the absorbed oxygen, and so on. As I work the process, the treatment with air and steam is frequently and automatically alternated, so that the surfaces of the granules are mainly operative. When thus treated, the granules retain their form indefinitely, which would not be the case if, at each alternation, a complete conversion of the material took place. When steam is first admitted to the retorts, oxygen, mixed with some remaining nitrogen, is expelled, this, which has hitherto been wasted, I utilize by passing it into other retorts in which oxygen is being absorbed. A more complete saturation of the material with oxygen is thereby obtained, and an increased yield results. Although it is not essential, I prefer to provide two sets of retorts, and so to work them that while absorption of oxygen is going on in one set, oxygen gas is being delivered from the other set. I provide each set with cocks or valves for alternately admitting air and steam, and for drawing off the gases, and I provide apparatus for the automatic control of all these cocks or valves. I also provide a separate cock or valve for drawing off the impure or dilute oxygen gas, which cock or valve also may be automatically controlled.

In order that both the process and apparatus constituting my invention may be thoroughly understood, I will describe them in detail, referring in so doing to the accompanying drawings which are to be taken as part of this specification and read therewith.

Figure 1 is a front elevation, partly in section, of a complete apparatus of one hundred retorts arranged as two sets in series. It is taken on the line A—B of Fig. 3. Fig. 2 is a half sectional side elevation taken on the line C—D of Fig. 3. Fig. 3 is a half sectional plan taken on the line E—F of Fig. 1.

A is the furnace for keeping the retorts at the proper temperature.

B, B are the retorts of one set; and B', B', the retorts of the other.

C, C' are mains connected, respectively, to the series of retorts B and B' by pipes $c$, $c'$.

D', D' are branches from these mains, respectively, to the pair of two-way cocks E, E'. These communicate in each case with the interior of the plug of the cock.

F is the air-supply main, and G, the steam-supply main. Both the last mentioned mains deliver into the shell or body common to both the cocks E, E'. One of these cocks is shut to the air supply and open to the steam supply while the other is in the opposite position. After a time both cocks are turned simultaneously and the connections reversed.

H, H' are the two gas mains for receiving the oxygen and nitrogen gases as these are given off alternately from the two sets of retorts. These mains are connected to the said sets of retorts, respectively, by small pipes $h$, $h'$.

I, I' are the respective branches to the pair of two-way cocks J, J'.

$j'$, $j^2$ are the oxygen, and $j^3$, $j^4$, the nitrogen exit ports in the respective plugs. The plugs are hollow for the greater part of their length, the gases entering them at their smaller ends.

The four two-way cocks E, E', and J, J', are of the same internal construction, and the two plugs of each pair are always in opposite positions. For instance, if the cock E is passing steam, the cock E' is passing air, and vice versa. So with the cocks J, J': if one is passing oxygen, the other is passing nitrogen, and vice versa. Provided that the alternate passage of their respective gases and fluids is provided for, the four cocks above mentioned may be of any convenient construction. All the four cock-plugs being set in their proper relative positions, they are fixed thereto by a link K, to which half-cranks $k$, $k'$, $k^2$, $k^3$, fast upon the heads of the plugs of the respective cocks, are pivoted.

L is the nitrogen exhaust.

M is the oxygen main leading from the cocks J, J', to the special cock N described farther on; and O is the branch to the bottom of the closed cooler P. This latter is kept supplied with cold water fed into it through a pipe $p$, while provision is made by means of a pipe $p'$ for the hot water to flow away. The cooler also acts as a water-seal for a purpose to be explained in the proper place.

Q is the oxygen main from the cooler to the storage reservoir.

The plug of the special cock N above mentioned is hollow like those of the cocks F, F', J, J', but, unlike them, it has only one delivery port $n$ which, it is to be noted, is of comparatively small area. The shell of the cock has two ports $n'$, $n^2$, opposite to each other, and these open respectively into two by-passes R, R',—one for each series of retorts. These by-passes deliver into the branches D, D', and so into the two series B, B', respectively. The plug of the cock N is axially fast to the shaft N' supported in suitable bearings. $N^2$ is a driving pulley keyed on the same shaft. The motion of the plug of the cock N is transferred to the link K by two pairs of miter gears $n^2$, $n^3$, $n^4$, $n^5$, a half crank $n^6$, and a connecting rod $n^7$, being thereby converted from one of rotation into a continuous reciprocating motion on the part of the said link. For each rotation of the plug, the link makes a double stroke, i. e., one forward and one backward. Provided that proper relative motions are preserved, any other gear may be used to connect these members of the apparatus.

The shaft N' is, according to the gear used to connect the plug of the cock N to the link K which I have illustrated, the first motion shaft of the apparatus, and consequently has the driving pulley keyed on it, as already described. This function of the said pulley ($N^2$) is clearly indicated in Fig. 1 by the dotted line $z$ passing round the same which indicates the presence and function of a driving belt driven from or by any motor adapted to operate the cocks of the apparatus, said cocks being always provided with suitable connections (such as those illustrated and described above) adapted to communicate the motion of one of the said cocks to all the others as set forth.

The figures illustrate the following stage of the process and the corresponding positions of the several parts of the apparatus. Steam is being sent through the bottom series of the retorts and deoxidizing the granules therein, pure oxygen being driven to the reservoir. Air is being sent through the top series.

The operation of my invention, in an apparatus constructed as illustrated, is as follows: The retorts B, B' having been filled and raised to the proper temperature, the air and steam at a suitable low pressure, are turned on into the respective supplies F and G, and the motor started. As the steam enters the series B, some oxygen is liberated, and this initial efflux, diluted with air as already explained, flows through the pipes $h$, the main H, the branch I, the cock J', its port $j'$, and the main M into the cock N. When this quantum of oxygen and air reaches the said cock, the port $n$ is communicating through the port $n'$ with the by-pass R', through which, the branch D', the main C', and the pipes $c'$, the mixture flows into the top series B' wherein the oxygen is absorbed by the granules which have been deoxygenated. It is because the mixture finds the branch O sealed against it by the water in the cooler, that it takes the open course through the cock N. The rate of rotation of the cock N is so timed as to close the ports $n$, $n'$, as soon as pure oxygen begins to flows from the retorts, so that after the mixture of air and oxygen has passed the cock, the pure oxygen must flow or be driven, by the pressure of the oxygen behind it, down the branch O into the water of the cooler P, and thence through the main Q to the reservoir. The steam accompanying the gas into the coolers is condensed there. By the time all the free oxygen from the series B has passed the cock J', the motion of the link K to the right has moved the port $j'$ downward to the left away from the main M, and opened the port $j^4$ to the nitrogen exhaust L. At the same time, the steam supply is cut off from the said series B, and the air supply turned into the retorts thereof by the reversal of the cock E. As the air enters the said retorts, it parts with its oxygen to the already deoxygenated granules, and the isolated nitrogen is driven through the pipes $h$, the main H, the branch I, the cock J', the port $j^4$, into the exhaust L. While the oxygenation described in the last paragraph has been proceeding, steam has been flowing through the retorts of top series, the phenomena being counterparts of those already described with reference to the bottom series. The time occupied by a complete cycle of operations (corresponding to an entire rotation of the cock N) is dependent more or less on the temperature; but when working at a dull red heat (which is preferred) it will be suitable if the duration of the cycle be seven minutes.

Although the drawings illustrate the conduct and embodiment of my invention in a two-series multiple retort apparatus, it must be distinctly understood that my invention is not confined in this respect, but may be applied to a single acting apparatus.

I wish it to be distinctly understood that I make no general claim to the production of free oxygen by the action of alternate currents of steam and air upon manganate of soda. I refer to British Patent No. 85 of A. D. 1866 (Marechal and Tessié du Motay) as descriptive of the said process in its simplest and initial form.

Having now particularly described and ascertained the nature of my said invention and in what manner the same is to be performed, I declare that what I claim is—

1. The combination with a retort of a closed communication or by-pass between the opposite ends of the retort; a cock controlling the said by-pass and adapted to automatically open it when the mixture of oxygen first liberated in the retort and there diluted with the atmospheric air previously therein is ready to be led out of the retort, and to close it after the said mixture has passed the cock; and a motor adapted to operate the said cock, as set forth.

2. The combination of a retort with a pair of two-way cocks one at either end of it adapted to be moved together and to respectively keep either open or closed for one and the same interval the steam supply and the oxygen exhaust or the air supply and the nitrogen exhaust, with a closed communication or by-pass between the opposite ends of the retort, a cock controlling the said by-pass and adapted to automatically open it when the mixture of oxygen first liberated in the retort and there diluted with the atmospheric air previously therein is ready to be led out of the retort and to close it after the said mixture has passed the cock, a motor adapted to operate the said five cocks, and suitable connections adapted to communicate the motion of one of the said cocks to all the others, as set forth.

In testimony whereof I have hereunto affixed my signature, in presence of two witnesses, this 17th day of November, 1890.

R. D. BOWMAN.

Witnesses:
HENRY H. LEIGH,
22 *Southampton Bdgs., London, England.*
JOSEPH LAKE,
17 *Gracechurch Street, London.*